United States Patent
Elia et al.

(10) Patent No.: US 10,693,204 B2
(45) Date of Patent: Jun. 23, 2020

(54) LITHIUM-AIR BATTERY

(71) Applicant: Bayerische Motoren Werke Aktiengesellschaft, Munich (DE)

(72) Inventors: Giuseppe Antonio Elia, Rome (IT); Jusef Hassoun, Latina (IT); Franziska Mueller, Muenster (DE); Dominic Bresser, Muenster (DE); Yang-Kook Sun, Seoul (KR); Stefano Passerini, Ulm (DE); Bruno Scrosati, Rome (IT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 15/350,258

(22) Filed: Nov. 14, 2016

(65) Prior Publication Data
US 2017/0149106 A1  May 25, 2017

Related U.S. Application Data

(63) Continuation of application No. PCT/EP2015/060339, filed on May 11, 2015.

(30) Foreign Application Priority Data

May 15, 2014 (DE) .................. 10 2014 209 209

(51) Int. Cl.
    H01M 12/08    (2006.01)
    H01M 10/0566  (2010.01)

(52) U.S. Cl.
    CPC ....... *H01M 12/08* (2013.01); *H01M 10/0566* (2013.01); *H01M 2220/20* (2013.01); *H01M 2300/0045* (2013.01); *Y02E 60/128* (2013.01)

(58) Field of Classification Search
    None
    See application file for complete search history.

(56) References Cited

U.S. PATENT DOCUMENTS

| | | | |
|---|---|---|---|
| 2008/0050657 | A1 | 2/2008 | Nishida et al. |
| 2012/0050945 | A1 | 3/2012 | Seddon et al. |

(Continued)

FOREIGN PATENT DOCUMENTS

| | | | |
|---|---|---|---|
| CN | 101103009 A | 1/2008 | |
| CN | 102263311 A | 11/2011 | |

(Continued)

OTHER PUBLICATIONS

International Search Report (PCT/ISA/210) issued in PCT Application No. PCT/EP2015/060339 dated Jul. 17, 2015, with English translation (six (6) pages).

(Continued)

*Primary Examiner* — Tracy M Dove
(74) *Attorney, Agent, or Firm* — Crowell & Moring LLP

(57) ABSTRACT

A lithium-air battery is provided which includes a gas diffusion layer that is at least partially filled with air, having an electrically conducting material as a cathode, an at least partially electrolyte-impregnated filter having an electronically non-conducting material as a separator, and an anode having a lithium metal, a lithium-metal alloy or lithium-oxide-metal mixture. The separator is between the anode and the cathode and the electrolyte includes a hydrophobic, ionic liquid and a lithium salt. The three phases, gaseous air, liquid electrolyte and solid conducting material, are in contact on at least one point of the gas diffusion layer. A method for producing such battery and the use of such battery in a motor vehicle are also provided.

16 Claims, 3 Drawing Sheets

(56) References Cited

U.S. PATENT DOCUMENTS

| | | |
|---|---|---|
| 2012/0290224 A1 | 11/2012 | Nishikoori et al. |
| 2013/0344403 A1 | 12/2013 | Albertus et al. |
| 2014/0004429 A1 | 1/2014 | Nakanishi |
| 2014/0023940 A1 | 1/2014 | Zaghib et al. |
| 2014/0106240 A1 | 4/2014 | Kotani et al. |
| 2014/0127596 A1 | 5/2014 | Sun et al. |

FOREIGN PATENT DOCUMENTS

| | | |
|---|---|---|
| CN | 102487154 A | 6/2012 |
| CN | 102714339 A | 10/2012 |
| CN | 102753529 A | 10/2012 |
| CN | 103370830 A | 10/2013 |
| CN | 103415953 A | 11/2013 |
| CN | 103636058 A | 3/2014 |
| CN | 103730665 A | 4/2014 |
| JP | 2012-243576 A | 12/2012 |
| WO | WO 2013/052911 A1 | 4/2013 |

OTHER PUBLICATIONS

German-language Written Opinion (PCT/ISA/237) issued in PCT Application No. PCT/EP2015/060339 dated Jul. 17, 2015 (six (6) pages).

German Search Report issued in counterpart German Application No. 10 2014 209 209.4 dated Nov. 17, 2014, with partial English translation (thirteen (13) pages).

Monaco, S., et al., "Role of Oxygen Mass Transport in Rechargeable $Li/O_2$ Batteries Operating with Lonic Liquids," The Journal of Physical Chemistry Letters, vol. 4, No. 9, May 2, 2013 pp. 1379-1382, XP055200721 (Four (4) pages).

Jung, H., et al., "An Improved High-Performance Lithium-Air Battery," Nature Chemistry, 2012, vol. 4, Jul. 2012, pp. 579-585 (Seven (7) pages).

Olivares-Marin, M., et al., "Effects of Architecture on the Electrochemistry of Binder-Free Inverse Opal Carbons as Li-Air Cathodes in an Ionic Liquid-Based Electrolyte," Journal of Material Chemistry A, 2013, vol. 1, No. 45, Sep. 14, 2013, pp. 14270-14279, XP055200708 (Ten (10) pages).

English translation of Chinese Office Action issued in counterpart Chinese Application No. 201580026541.4 dated Jun. 28, 2018 (12 pages).

English Translation of Chinese-language Office Action issued in counterpart Chinese Application No. 201580026541.4 dated Mar. 14, 2019 (17 pages).

Chinese-language Office Action issued in counterpart Chinese Application No. 201580026541.4 dated Oct. 9, 2019 with English translation (25 pages).

Xie K., "New Generation Lithium Secondary Battery Technology", National Defense Industry Press, Aug. 2013, pp. 189-192, (four (4) pages).

Yang et al., "Electrical Energy Conversion and Equalization Techniques for Series-Connected Energy Storage System", Harbin Institute of Technology Press, Jan. 2014, pp. 21-24, (four (4) pages).

8    9    10    11    12

LITHIUM-AIR BATTERY

CROSS REFERENCE TO RELATED APPLICATIONS

This application is a continuation of PCT International Application No. PCT/EP2015/060339, filed May 11, 2015, which claims priority under 35 U.S.C. § 119 from German Patent Application No. 10 2014 209 209.4, filed May 15, 2014, the entire disclosures of which are herein expressly incorporated by reference.

BACKGROUND AND SUMMARY OF THE INVENTION

The present invention relates to a lithium-air battery. The present invention further relates to a method of producing such battery and using such battery in motor vehicles.

Lithium-oxygen (Li—$O_2$), also known as lithium-air batteries, are considered to be a technology having a future potential. Theoretically, this technology provides specific energies and energy densities similar to those provided by Petrol. It therefore appears to be possible to power electric vehicles up to a range of 550 km and more by this means.

The fundamental functional principle of all lithium-air batteries, despite considerable individual differences in their structure, is based on the following: during discharge, positively charged lithium ions are released from a lithium metal or a lithium alloy at the negative electrode with the release of electrons and then passes through the electrolyte to the positive electrode where the lithium ions react with oxygen ($O_2$) first to form lithium superoxide ($LiO_2$), and then forming lithium peroxide ($Li_2O_2$). During charging of the battery, this process is reversed. Oxygen ($O_2$) is released at the positive electrode while metallic lithium is deposited or a lithium alloy is formed at the negative electrode.

Monaco S., Soavi F., and Mastragostino M., "Role of Oxygen Masstransport in Rechargeable Li/$O_2$ Batteries Operating with Ionic Liquids," J. Phys. Chem. Lett. 2013, 4, 1379-1382, discloses a lithium-oxygen battery which is operated in a two-phase reaction mode. In detail, an oxygen-enriched electrolyte composed of N-butyl-N-methylpyrrolidinium bis(trifluoromethanesulfonyl)imide and lithium bis (trifluoromethane-sulfonyl)imide ($PYR_{14}TFSI:LiTFSI$; in a molar ratio of 9:1) passed through an electrochemical cell having an anode composed of a lithium metal and a cathode which is composed of mesoporous carbon and is separated from the anode by a separator. During charging and discharging of the battery, considerable hysteresis and decomposition of the electrolyte occurred.

Jung. H. G., Hassoun J., Park J. B., Sun Y. K., and Scrosati B., "An Improved High-Performance Lithium-Air-Battery," Nature Chemistry, 2012, 4, 579-585, discloses a lithium-air battery having a three-phase reaction mode, in which a carbon material coated with conductive carbon is used as a cathode, with an anode which is composed of lithium foil and is separated from the cathode by a separator composed of glass fibers. Tetraethylene glycol dimethyl ether-lithium triflate ($TEGDME-LiCF_3SO_3$) served as an electrolyte. During charging and discharging of the battery, considerable hysteresis occurred leading to comparatively low energy efficiency.

The present invention relates to a lithium-air battery having improved properties. The present invention also relates to a method of producing such battery and using such battery in motor vehicles.

In one aspect of the invention, a lithium-air battery is provided which includes a cathode, a separator and an anode, with the separator physically separating the anode and the cathode from one another.

The cathode is a gas diffusion layer which is at least partially filled with air and contains or preferably consists of an electronically conductive material.

The anode contains a material selected from the group consisting of lithium metal, lithium metal alloy, in particular lithium-silicon or lithium-tin alloys, and lithium oxide metal mixtures, and mixtures thereof.

The separator is a filter which contains or preferably consists of an electronically non-conductive material. The filter is impregnated at least partially with an electrolyte. The separator preferably contains a material selected from the group consisting of glass fibers, cellulose fibers, organic polymer, and mixtures thereof. As for the organic polymer, preferably it is to use a polymer or copolymer which includes a polymerization unit selected from the group consisting of polyethylene, polypropylene, and mixtures thereof. The organic polymer can be coated with ceramic. Preferably, the separator consists of one or more of these materials.

The electrolyte includes a hydrophobic, ionic liquid and a lithium salt. The electrolyte is preferably a liquid at room temperature (20° C.) and atmospheric pressure. The hydrophobic, ionic liquid serves as a solvent for the lithium salt. The electrolyte can include not only the hydrophobic, ionic liquid but also any other hydrophobic solvent in any amount, as long as the purpose of dissolving the lithium salt is achieved to a satisfactory extent. The electrolyte preferably includes at least 50 mol %, more preferably 80 mol % of hydrophobic, ionic liquid. The hydrophobic, ionic liquid can include two or more ionic liquids and/or two or more lithium salts. This makes it possible to control the temperature range of the liquid electrolyte.

In one aspect of the invention, the lithium-air battery is constructed in such a way that there is at least one point, preferably at least one line, on the gas diffusion layer at which the three phases: gaseous air, liquid electrolyte and solid electronically conductive material are in contact.

As used herein, the expression "gas diffusion layer, at least partially filled with air" means that the gas diffusion layer can be filled not only with air but also partially with the electrolyte. As used herein, the term "air" refers to any gas or gas mixture which includes at least oxygen and is compatible with a lithium-air battery. In particular, as used herein, the term "air" encompasses pure oxygen and also the air from the surroundings of the lithium-air battery. As used herein, the expression "filter which is at least partially impregnated with an electrolyte" refers to a filter which can be filled not only with electrolytes but also partially filled with air.

In one aspect of the invention, the lithium-air battery provides an electrochemical energy storage device which has stable reversible cycling performance, high coulombic efficiency and a charging potential which is significantly reduced compared to the prior art, i.e., a substantially reduced voltage hysteresis.

In one aspect of the invention, the electrolyte preferably includes alicyclic nitrogen cations having an asymmetric structure. Such an electrolyte is a liquid with a wide temperature range and is additionally distinguished by high electrochemical stability. The alicyclic ring on the nitrogen preferably has from five to seven ring atoms including the nitrogen atom. This further increases the electrochemical stability.

In a preferred embodiment, the electrolyte includes alicyclic nitrogen cations having an asymmetric structure in which the quaternary nitrogen is bond to a methyl group and an alkyl or alkoxy group selected from the group consisting of $(CH_2)_nCH_3$, $(CH_2)_n$—$OCH_3$ and $(CH_2$-$CH_2O)_n$—$CH_3$, where n=1-4, in addition to the alicyclic ring. This maintains a liquid state of matter over a wide temperature range and also a high electrochemical stability at the same time.

In a preferred embodiment, the electrolyte includes nitrogen cations selected from the group consisting of N-butyl methylpyrrolidinium, N-methoxyethyl-N-methyl-pyrrolidinium, and mixtures thereof.

In a particular embodiment, the electrolyte includes anions having a highly delocalized negative charge. Preferably, the anion is a fluorinated sulfonyl imide. The electrolyte preferably includes bis(trifluoromethanesulfonyl)imide as the anion.

In a preferred embodiment, the lithium salt comprises lithium bis(trifluoromethanesulfonyl)imide.

In a preferred embodiment, the molar ratio of the lithium salt to the electrolyte is from 1:20 to 1:2.

In a preferred embodiment, the gas diffusion layer includes a woven carbon fiber fabric or a non-woven carbon fiber fabric.

In a preferred embodiment, the gas diffusion layer is coated with conductive carbon black. The conductive carbon black is preferably produced by the TIMCAL process. The process is based on partial oxidation of oil from carbochemical and petrochemical raw materials. The process is characterized by adherence to particular aerodynamic and thermodynamic conditions, in particular a low oxidation rate and dispensing with quenching additives and other additives. This gives a material virtually without residues on a sieve having a mesh number of 325, which has a very high purity. Preference is given to using a conductive carbon black having a low specific surface area, for instance Super P®. This conductive carbon black has a chain-like structure comparable to acetylene black.

In a preferred embodiment, the separator is a filter composed of glass fibers.

In a preferred embodiment, the anode includes a foil composed of lithium metal.

In a preferred embodiment, the battery is encapsulated in such a way that air can penetrate into the gas diffusion layer. The encapsulation preferably has holes on the side facing the cathode, which holes are sufficiently large and numerous to allow air to pass through in a sufficient amount.

In another aspect of the invention, a method for producing a lithium-air battery is provided, which includes: stacking on top of one another under protective gas of: a gas diffusion layer including an electronically conductive material as a cathode; a filter which is at least partially impregnated with an electrolyte and includes an electronically non-conductive material as a separator; and an anode comprising a lithium metal, a lithium metal alloy or a lithium oxide-metal mixture. The separator is between the cation and the anion. The electrolyte includes a hydrophobic, ionic liquid and a lithium salt. The three phases, gaseous air, liquid electrolyte and solid electronically conductive material, are in contact on at least one point of the gas diffusion layer, and the lithium-air battery is encapsulated so that air can penetrate into the gas diffusion layer.

In another aspect of the invention, a lithium-air battery is provided for use in a motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
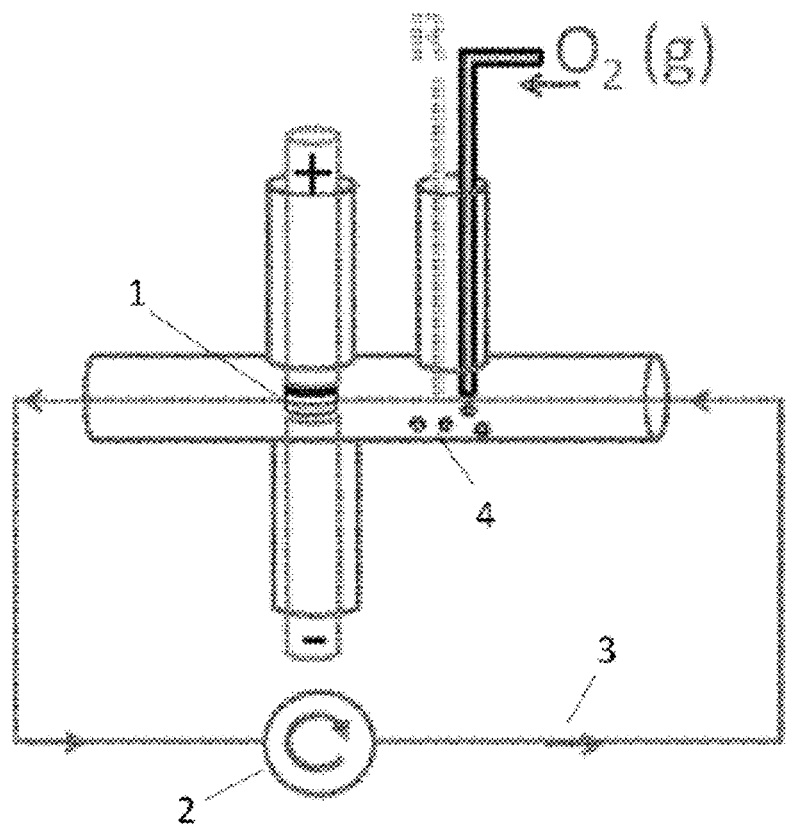
FIGS. 1A and 1B show a lithium-air battery having a two-phase mode of reaction according to the prior art.
Figure 1B:
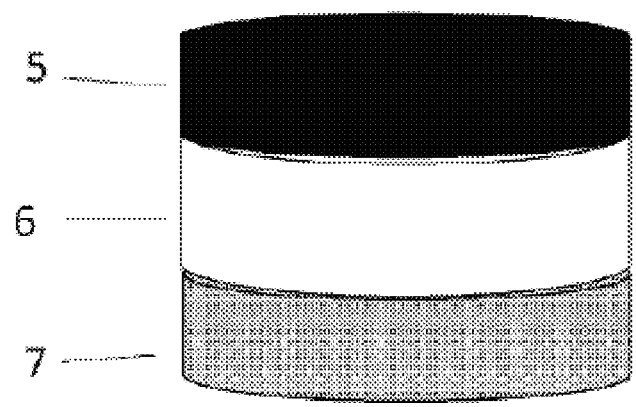

FIG. 1 schematically shows a lithium-oxygen battery having a two-phase mode of reaction according to the prior art (See Monaco S. et al., described above). Here, a hydrophobic, ionic electrolyte (3) which is a liquid at room temperature, specifically, it is N-butyl-N-methylpyrrolidinium bis(trifluoromethanesulfonyl)imide and lithium bis (trifluoromethanesulfonyl)imide ($PYR_{14}TFSI:LiTFSI$, in a molar ratio of 9:1, is enriched with oxygen (4) by means of a peristaltic pump (2) and passed through an electrochemical cell, generating electric power (See FIG. 1A). The electrochemical cell consists of mesoporous carbon (5) as a cathode, a separator (6) and a lithium metal as an anode (7) (See FIG. 1B). Outside the electrochemical cell, a reference electrode R additionally dips into the electrolyte.

Figure 2:
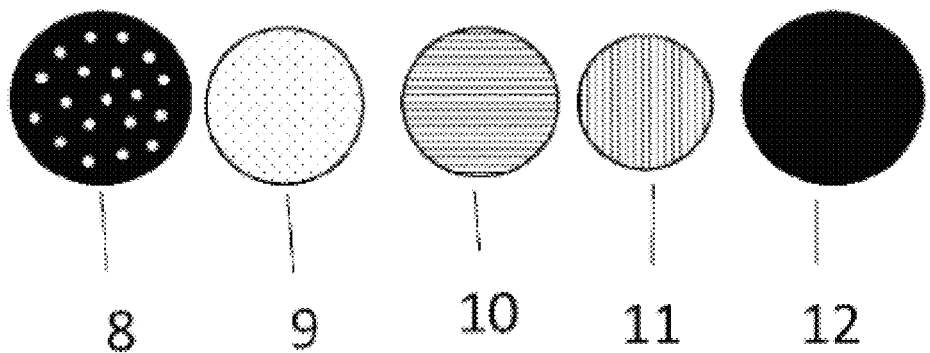
FIG. 2 schematically shows a lithium-air battery in accordance with one or more aspects of the invention in the form of an encapsulated button cell before assembly.

In a preferred embodiment of the present invention, the lithium-air battery is produced as a button cell (FIG. 2). For this example, a piece of lithium metal foil (11) is used as the anode, the separator is composed of glass fibers (10) which is impregnated with a hydrophobic, ionic electrolyte, and a piece of woven carbon fiber fabric or non-woven carbon coated with conductive carbon is used as the cathode, are all placed in the lid of a commercial button cell (12) (for example of the R3032 type) in a glove box filled with protective gas and closed by means of a lid (8) of a commercial button cell which has previously been provided with holes which allow passage of air.

Figure 3:
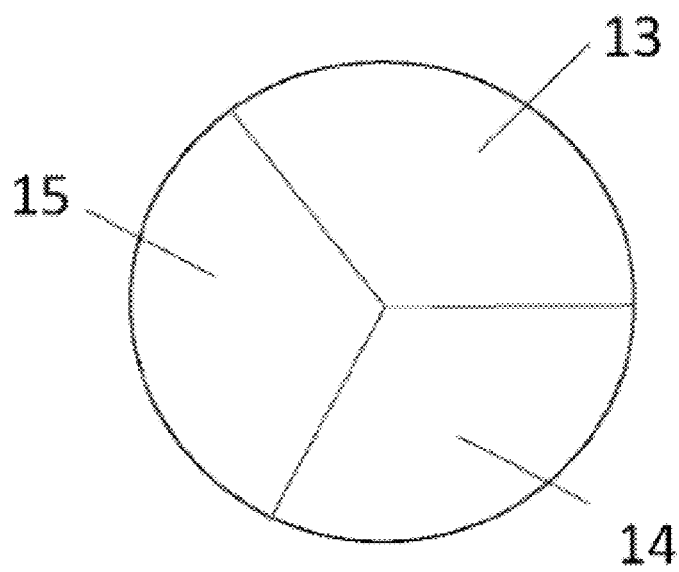
FIG. 3 shows a phase diagram for the lithium-air battery of the invention, which schematically shows that the three phases gaseous air, liquid electrolyte and solid conductive material are in contact on at least one point of the gas diffusion layer.

As shown in FIG. 3, such a lithium-air battery according to the invention has at least one point in the gas diffusion layer (9) at which the three phases: gaseous air, liquid electrolyte and solid carbon of the gas diffusion layer (9) are in contact. This is shown schematically in FIG. 3, where (13) is the solid phase, (14) is the liquid phase and (15) is the gaseous phase.

Figure 4:
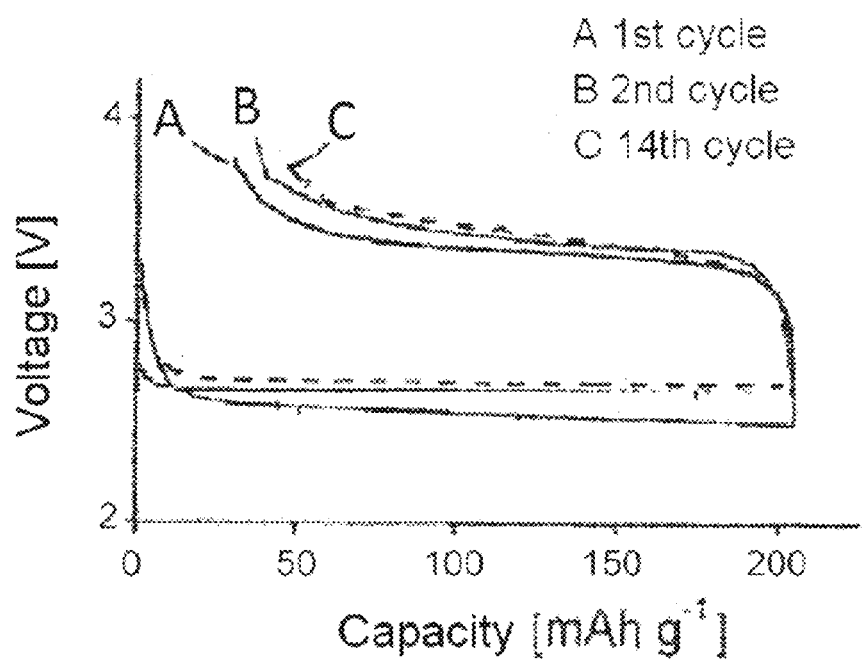
FIG. 4 shows the specific capacity of the lithium-oxygen battery according to the prior art shown in FIG. 1 with different discharging and charging cycles.

In FIG. 4, the specific capacity of the lithium-oxygen battery according to the prior art (FIG. 1) is plotted against the voltage for the charging-discharging cycles 1, 2 and 14. It can be seen here that strong hysteresis between charging and discharging occurs. In addition, the charging and discharging curves for the first, second and fourteenth cycle deviate considerably from one another. During charging, the lithium-oxygen battery can no longer be fully regenerated.

This is indicated in FIG. 4 by charging stopping in the upper charging section of the curve before the value zero is reached. This can be explained by irreversible processes in the lithium-oxygen cell, e.g., decomposition of the electrolyte.

Figure 5:
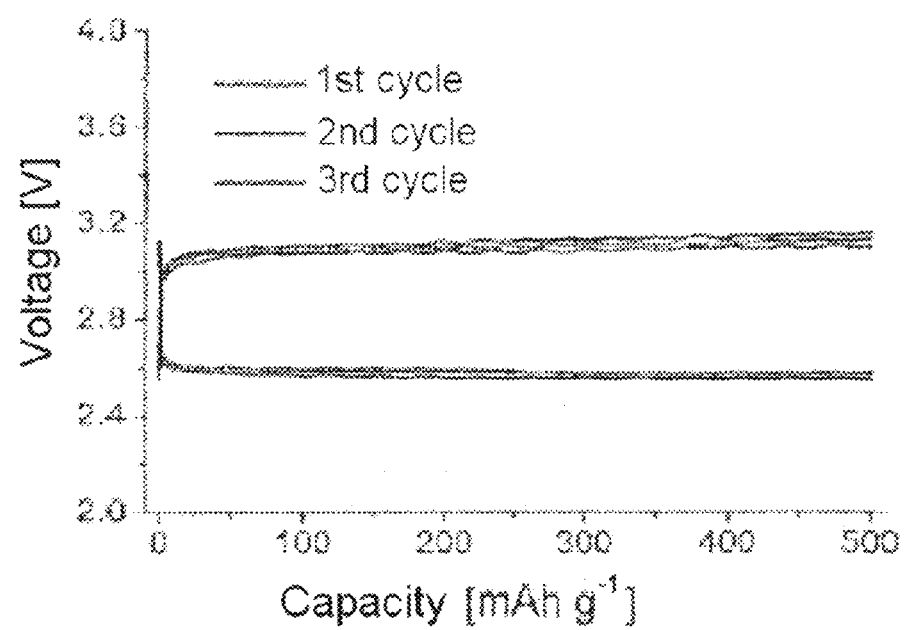
FIG. 5 shows the specific capacity of a lithium-air battery (button cell) in accordance with one or more aspects of the invention, with three cycles of charging and discharging being carried out in succession.

In contrast thereto, only a very small hysteresis between the charging and discharging curves occurs in the case of the lithium-air battery of the invention. The curves for the first to third cycle superimpose very well and complete charging is possible without visible irreversible processes (See FIG. 5).

EXAMPLES

To produce the oxygen electrode, a hydrophobic gas diffusion layer (for example Toray TGP-H-030) was coated with a slurry comprising 80 percent by weight of conductive carbon (for example Super P®, Timcal) and 20 percent by weight of polyvinylidene fluoride (PVdF) (Solvay) dispersed in N-methyl-2-pyrrolidone (NMP) using a laboratory coating knife. The final carbon loading was about 1.0+/−0.1 mg cm$^{-2}$. The coated gas diffusion layer was then dried at 100° C. under reduced pressure for 12 hours. Button cells (for example of the R3032 type) were assembled under an argon atmosphere in a glove box. The lithium metal anode and the oxygen electrode were separated by a sheet composed of glass fibers (for example from Whatman) which had been impregnated with PYR$_{14}$TFSI-LiTFSI (in a molar ratio of 9:1) as the electrolyte.

LIST OF REFERENCE SYMBOLS

R Reference electrode
1 Electrochemical cell
2 Peristaltic pump
3 Electrolyte ((PYR$_{14}$TFSI):LITFSI in a ratio of 9:1)
4 Dissolved oxygen
5 Cathode composed of mesoporous carbon
6 Separator
7 Lithium metal
8 Encapsulation (upper side with holes)
9 Cathode composed of carbon nonwoven coated with conductive carbon
10 Filter composed of glass fibers
11 Anode composed of lithium metal foil
12 Encapsulation underside
13 Solid phase (carbon nonwoven coated with conductive carbon)
14 Liquid phase (hydrophobic, ionic electrolyte which is liquid at room temperature)
15 Gaseous phase (air)

The above description of the present invention serves only for illustrative purposes and not for the purpose of restricting the invention. Various alterations and modifications are possible within the framework of the invention, without going outside the scope of the invention and its equivalents.

What is claimed is:

1. A lithium-air battery comprising:
   a gas diffusing cathode consisting of a solid electronically conductive material, wherein the gas diffusing cathode is at least partially filled with gaseous air;
   a separator comprising an electronically non-conductive material, wherein the separator is at least partially impregnated with a liquid electrolyte; and
   an anode comprising a lithium metal, a lithium metal alloy or a lithium oxide-metal mixture,
   wherein the separator is present between the cathode and the anode,
   wherein the liquid electrolyte comprises a hydrophobic, ionic liquid and a lithium salt,
   wherein the solid electronically conductive material comprises a woven carbon fiber fabric or a non-woven carbon fiber fabric, and
   wherein on at least one point on the gas diffusing cathode, the gaseous air, the liquid electrolyte and the solid electronically conductive material are in contact.

2. The lithium-air battery according to claim 1, wherein the liquid electrolyte comprises a quaternary ammonium cation having an asymmetric structure.

3. The lithium-air battery according to claim 2, wherein the quaternary ammonium cation has an aryl group which is a 5 to 7 membered carbon ring.

4. The lithium-air battery according to claim 2, wherein nitrogen of the quaternary ammonium cation binds to a methyl and a radical selected from the group consisting of $(CH_2)_n$—$CH_3$, $(CH_2)_n$—O—$CH_3$ and $(CH_2$—$CH_2O)_n$—$CH_3$, wherein n=1-4.

5. The lithium-air battery according to claim 2, wherein the quaternary ammonium cation is selected from the group consisting of N-butyl-N-methyl pyrrolidinium, N-methoxyethyl-N-methylpyrrolidinium, and mixtures thereof.

6. The lithium-air battery according to claim 1, wherein the liquid electrolyte comprises an anion.

7. The lithium-air battery according to claim 6, wherein the anion is fluorinated sulfonyl imides.

8. The lithium-air battery according to claim 6, wherein the anion is bis(trifluoromethanesulfonyl)imide.

9. The lithium-air battery according to claim 1, wherein the lithium salt comprises lithium bis(trifluoromethanesulfonyl)imide.

10. The lithium-air battery according to claim 1, wherein a molar ratio of the lithium salt to the liquid electrolyte is from 1:2 to 1:20.

11. The lithium-air battery according to claim 1, wherein the gas diffusing cathode is coated with conductive carbon black.

12. The lithium-air battery according to claim 1, wherein the separator comprises a material selected from the group consisting of glass fibers, cellulose fibers and organic polymer.

13. The lithium-air battery according to claim 1, wherein the anode comprises a foil composed of lithium metal.

14. The lithium-air battery according to claim 1, wherein the battery is encapsulated in such a way that air can penetrate into the gas diffusing cathode.

15. A process for producing the lithium-air battery according to claim 1, comprising:
   stacking on top of one another under protective gas: the gas diffusing cathode;
   the separator which is at least partially impregnated with the liquid electrolyte; and the anode, and
   encapsulating the lithium-air battery so that the gaseous air can penetrate into the gas diffusing cathode.

16. A motor vehicle having the lithium-air battery according to claim 1.

* * * * *